United States Patent [19]

Dao

[11] Patent Number: 5,157,942

[45] Date of Patent: Oct. 27, 1992

[54] REGENERATIVE ABSORPTION CYCLES WITH MULTIPLE STAGE ABSORBER

[76] Inventor: Kim Dao, 12 Nace Ave., Piedmont, Calif. 94611

[21] Appl. No.: 715,565

[22] Filed: Jun. 14, 1991

[51] Int. Cl.$^5$ .............................................. F25B 15/00
[52] U.S. Cl. ........................................ 62/476; 62/483; 62/486
[58] Field of Search ................ 62/476, 483, 486, 332, 62/335, 513, 512

[56] References Cited

U.S. PATENT DOCUMENTS

| | | | |
|---|---|---|---|
| 4,442,677 | 4/1984 | Kauffman | 60/673 |
| 4,841,744 | 6/1989 | Kurosawa et al. | 62/475 |
| 4,921,515 | 5/1990 | Dao | 62/335 |
| 5,024,063 | 6/1991 | Erickson | 62/101 |

OTHER PUBLICATIONS

Conceptual Design of an Advanced Absorption Cycle: The Double Effect Regenerative Absorption Refrigeration Cycle, Kim Dao, LBL Report LBL-8405, Sep. 1978.
"A New Absorption Cycle: The Single Effect Regenerative Absorption Cycle," LBL Report LBL-5911, Feb. 1978.
"Performance of an Experimental Solar-Driven Absorption Air Conditioner"—Annual Report Jul. 1975-Sep. 1976, LBL Report LBL-5911, Jan., 1977.

Primary Examiner—Albert J. Makay
Assistant Examiner—William Doerrler
Attorney, Agent, or Firm—Phillips, Moore, Lempio & Finley

[57] ABSTRACT

An improved regenerative absorption refrigeration cycle having a high COP and a commercially practicable pumping system. In the basic cycle, an ammonia/water solution is boiled in an externally-heated generator (11). The boiled-off ammonia vapor is cooled (14) in a regenerator (16), condensed (28), expanded to low pressure (32), and boiled in an evaporator (34) to extract heat from fluid circulating to and from a cooling load (41). The low-pressure liquid ammonia returns (46) to the regenerator (16) and is absorbed back into the low-pressure water from the generator. The solution is then cooled in a low-pressure absorber (50), pumped (53) to a high-pressure conduit (57) which is heated by the regenerator heat before going back to the generator 11. The improved cycle uses at least one intermediate absorber stage 60 to absorb more ammonia vapor (69, 71) into the solution coming from the lower pressure absorber (50) to produce a cooled solution of higher ammonia concentration. This higher concentration can be used to precool (87) the liquid refrigerant prior to expansion (32). Liquid is injected (106) into the ammonia vapor returning (46) to the regenerator to boil and transport heat from the cold end to the hot end of the regenerator. The ammonia vapor is injected into the water in the regenerator at distributed points (101, 102, 103, 19) along the flow path of the water for better heat balance.

20 Claims, 6 Drawing Sheets ated is too large and the pumping rates are high.
REGENERATIVE ABSORPTION CYCLES WITH MULTIPLE STAGE ABSORBER This invention relates to absorption refrigeration cycles using high temperature heat as the driving source, and more particularly to improved regenerative absorption cycles having high coefficients of performance (COP) under broad ranges of operating temperatures.

Absorption cycles can be roughly classified into three categories: the basic single-effect cycle, multiple-effect cycles and regenerative-absorption cycles.

The basic single-effect absorption cycle has been used for decades. In such a cycle a working fluid pair, e.g. ammonia/water is heated in a generator, at high pressure to a temperature sufficient to boil off the ammonia ($NH_3$) as a vapor. The high-pressure ammonia vapor is next cooled in a condenser to liquify the ammonia. The pressure of the liquid ammonia is then reduced so that it may boil at a low, refrigerating temperature in an evaporator. As the ammonia vaporizes, it absorbs heat from the cooling load. The ammonia vapor then goes to an absorber where it is absorbed back into low pressure water coming from the generator, with the heat of absorption being rejected to a heat sink. The absorbed $NH_3$/water solution is then pumped back to the generator to complete the cycle.

The basic single-effect cycle has a low COP. It is not successful in applications where energy cost is an important consideration.

Multiple-effect cycles are essentially arrangements of multiple single-effect cycles in such a way that heat couplings are provided between either the condenser of one single-effect cycle to the generator of another single effect cycle (condenser-coupled double-effect cycle) or the absorber of one single-effect cycle is heat coupled to the generator of another cycle (absorber coupled double-effect cycle) or both the condenser and the absorber of one single-effect cycle are heat coupled to the generator of another cycle (triple-effect cycle).

Since the heat couplings in multiple-effect cycles are constrained by the tight matching of temperatures between the heat rejecting components (i.e. the condenser and absorber) and the heat receiving component (i.e. generator or boiler), a change in the heat sink temperature requires a readjustment of the temperature of the refrigerated medium or a readjustment of the temperature of the heat source. The latter is not always possible because the heat source is already at its highest temperature to achieve the highest COP possible.

The undesirable cut-off characteristics of multiple-effect cycles narrows their applications to those where the temperatures of the heat sink and of the refrigerated medium are relatively constant, such as air-conditioning systems using water cooling towers as heat sinks.

Under optimum operating conditions the COP of multiple-effect cycles can be 60% (for double-effect cycles) or 85% (for triple-effect cycles) higher than that of the single-effect cycle.

Regenerative-absorption cycles are those in which heat produced by the absorption of the low pressure refrigerant vapor back into the low pressure absorbing fluid is used to heat the fluid after it has been pumped up to high pressure.

The generator-absorber heat exchange (GAX) can be considered as the simplest of the regenerative-absorption cycles. The GAX cycle is essentially a single-effect cycle in which internal heat regeneration (or recouperation) is attempted between the generator and absorber when temperature overlaps permit. The optimum COP of a GAX cycle is about the same as that of a double-effect cycle.

In any externally heated heat engine, whether producing work or refrigeration, a working fluid is circulated between the heat source and the heat sink. The temperature of the working fluid should approach the temperature of the heat source during the heat input process and should approach the temperature of the heat sink during the heat rejection process. The better the temperature approaches, the higher the COP (or efficiency).

Internal heat regeneration is necessary to obtain good temperature approaches. The working fluid travelling from the heat source to the heat sink must be cooled internally as much as possible before it reaches the heat sink. Conversely, the working fluid pumped up from the heat sink to the heat source must be heated by internal heat exchange as much as possible before the fluid reaches the heat source.

In order to increase the COP of regenerative-absorption cycles, regenerative flow paths and loops must satisfy three criteria:

(1) The amount of heat to be regenerated must be small to reduce the physical size of the regenerator and to minimize losses due to the difference in heat exchange temperatures;

(2) The temperature approaches to the heat input and to the heat rejection processes must be close for high COP;

(3) For commercial practicability, the number of pumps, their operating temperatures and their pumping rates must be minimized to reduce cost and increase reliability.

U.S. Pat. No. 4,442,677 to K.W. Kauffman in 1984 discloses a variable effect absorption cycle that has internal regeneration, but the amount of heat regenerated is too large and the pumping rates are high.

U.S. Pat. No. 4,921,515 to K. Dao in 1990 discloses an advanced regenerative-absorption cycle which can have a COP of the 130% higher than that of a single-effect cycle. However, this cycle does not satisfy the third criterion above, in that the circulation pump of the topping cycle is subjected to high temperatures and must operate at a high flow rate. The high temperatures could be avoided by subcooling the solution through the regenerator and pumping it back through the regenerator but doing so would increase the amount of heat needed to be regenerated and would degrade the COP.

SUMMARY OF THE INVENTION

It is the principal object of the present invention to provide an improved regenerative-absorption cycle that has a high COP and is commercially practicable.

To achieve the foregoing and other objects, a regenerative-absorption cycle is provided having a multiple stage absorber for increasing the temperature approach to the heat sink and in which part of the solution from a lower-pressure externally-cooled absorber is pumped up to the liquid inlet of a higher-pressure externally-cooled absorber, in which another part of the solution from the lower pressure absorber is pumped up to a boiling conduit in the regenerator and heated so that a portion of the refrigerant in the solution is boiled off, with the boiled off refrigerant vapor being then introduced into the higher pressure absorber to be absorbed into the solution therein, thereby resulting in a cooled solution from the higher pressure absorber at the heat sink temperature and with a greater concentration of refrigerant than from the lower pressure absorber.

Another aspect of the invention is that the higher concentration liquid from the higher-pressure absorber can be expanded and boiled to provide precooling of the high-pressure liquid refrigerant coming from the condenser and prior to its expansion into the evaporator of the cycle.

A further aspect of the invention is the injection of solution that is relatively weak in refrigerant into the refrigerant vapor returning from the evaporator to the regenerator for absorption into the liquid absorbent flowing through the regenerator. The injected solution is boiled by heat from the regenerator and mixes with the refrigerant vapor to produce a vapor of higher concentration of absorbent vapor before being released from absorption in the regenerator. This injection essentially uses the low temperature heat readily available at the cold end of the regenerator to boil the injected fluid, with heat being transported in the form of absorbent vapor, to the hot end of the regenerator where heat is in short supply.

Yet another aspect of the invention is that means are provided for the distributed release of vapor into the regenerator for absorption into the liquid absorbent over the length of the flow path of the absorbent through the regenerator such that at the hot end of the regenerator only a minimal amount of vapor is released into the absorbent liquid for absorption. The mixing of a small amount of vapor into the absorbent at the hot end of the regenerator will conserve the high temperature of the mixture that otherwise might be cooled down, by an introduction of a large amount of vapor, too much to be useful.

Additional objects, advantages and novel features of the invention will be set forth in the description which follows, and in part will become apparent to those skilled in the art upon examination of the following, or may be learned by practice of the invention. The objects and advantages of the invention may be realized by the instrumentalities and combinations pointed out in the appended claims.

BRIEF DESCRIPTION OF THE DRAWINGS

The accompanying drawings, which are incorporated in and form part of the application, together with the description, serve to explain the principles of the invention.

FIG. 3 illustrates only a part of the entire cycle of FIG. 3A, but illustrates portion of FIG. 1 which has been changed to produce the cycle of FIG. 3A.

DESCRIPTION OF THE PREFERRED EMBODIMENTS

Figure 1:
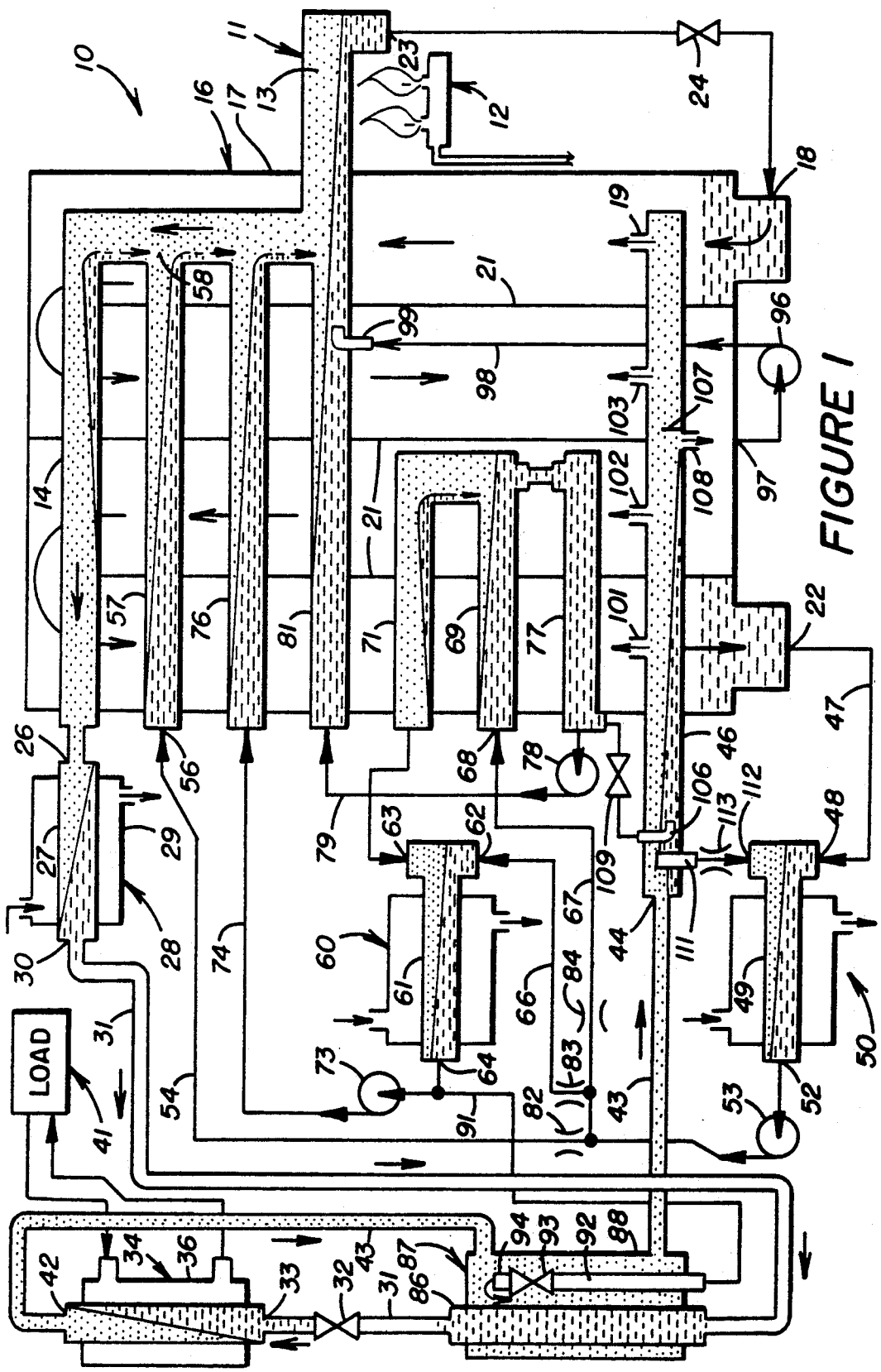
FIG. 1 is a generally schematic illustration of a multiple-stage-absorber regenerative-absorption cycle embodying the principles of the invention and using three pumps.

Referring now to the drawings, wherein preferred embodiments are shown, and in particular to FIG. 1 wherein a first embodiment is shown, the multiple-stage-absorber regenerative-absorption cycle 10 includes a basic regenerative-absorption cycle comprising a high-pressure generator 11 externally heated, as by a burner 12. The cycle preferably uses ammonia/water or ammonia/brine as the refrigerant-absorbent working fluid pair, but other refrigerant-absorbent fluid pairs may be used. The description below relates to the use of an ammonia/water pair. Although specific temperatures, pressures and concentrations are set forth, it is to be understood that these parameters are set forth merely to illustrate the operation and that the use of the invention is not limited thereto. It will be appreciated that different temperatures, pressure and concentrations would be expected for optimum results with different fluid pairs.

The ammonia/water solution in the interior 13 of generator 11 is at a pressure of about 250 psig and will be heated to a temperature of about 380° F. to boil off ammonia and water vapors. These vapors pass out of the generator to the conduit 14 extending through the regenerator 16.

The regenerator 16 comprises a heat exchanger with an external shell 17, a liquid inlet 18, a vapor inlet 19, and internal baffles 21 which form a plurality of serially-connected sections within the shell to channel fluid entering through the inlets in an elongated serpentine flow path through the interior of the shell to the liquid outlet 22. Liquid from the liquid outlet 23 of generator 11, at a concentration of about 5% $NH_3$, passes through expansion valve 24, to reduce its pressure to about 70 psig, and enters the liquid inlet 18 of the regenerator. Ammonia and water vapors will enter the regenerator, as at vapor inlet 19, and the vapor will absorb into the liquid to release heat. The temperature in the regenerator will decrease in a downstream direction from the inlets to the outlet 22 thereof.

As the vapors from the generator pass through conduit 14 they will be cooled and rectified, with the condensate from the water vapor draining by gravity back into the generator. The vapor in conduit 14 leaving the regenerator 16 is about 100% $NH_3$ and enters the inlet 26 of tube 27 of condenser 28. As the ammonia vapor passes through the condenser, cool heat-sink water passing through shell 29 will cause the vapor to condense. The liquid ammonia leaving the condenser outlet 30 will flow through line 31 to the expansion valve 32 where the pressure is reduced from 250 psig to about 70 psig. The low pressure fluid enters inlet 33 of the evaporator 34 and the heat from the refrigerating fluid circulating through the evaporator shell 36 will cause the liquid ammonia to boil. As the ammonia boils it absorbs heat from the refrigerating fluid in the shell so that the fluid leaving the shell is colder than when it entered. The cooled refrigerating liquid is then used in the conventional cooling coils (now shown) of the cooling load 41, i.e. the space which is to be refrigerated by the cycle 10. The temperature of the fluid leaving the shell 36 will be in the order of 38° F.

The low-pressure ammonia vapor will now leave the outlet 42 of evaporator 34 and pass through line 43 to the inlet 44 of the low-pressure conduit 46 extending into regenerator 16, with the vapor then being injected into the low-pressure liquid coming down from the generator outlet 23 and expansion valve 24.

The solution of ammonia and water leaving the outlet 22 of the regenerator 16 will flow through line 47 to the liquid inlet 48 of tube 49 in the low pressure absorber 50. Although absorber 50 is shown as separate from condenser 28, they will preferably have the same shell 29, with the tubes 27 and 49 being cooled by the same heat-sink fluid flowing through the shell 29.

The cooled ammonia/water solution leaving the outlet 52 of absorber 50 is pumped by pump 53 to the high 250 psig pressure of the cycle and flows through line 54 to the inlet 56 of the high-pressure boiling conduit 57 extending through regenerator 16. The outlet 58 of conduit 57 is in communication with the interior 13 of generator 11. As the ammonia/water solution passes through the conduit 57, it is heated by the absorption of the ammonia into the fluid circulating through the regenerator 16 and will boil, with vapors going off to conduit 14 and with the remaining liquid draining into the generator 11 for further heating.

Figure 1A:
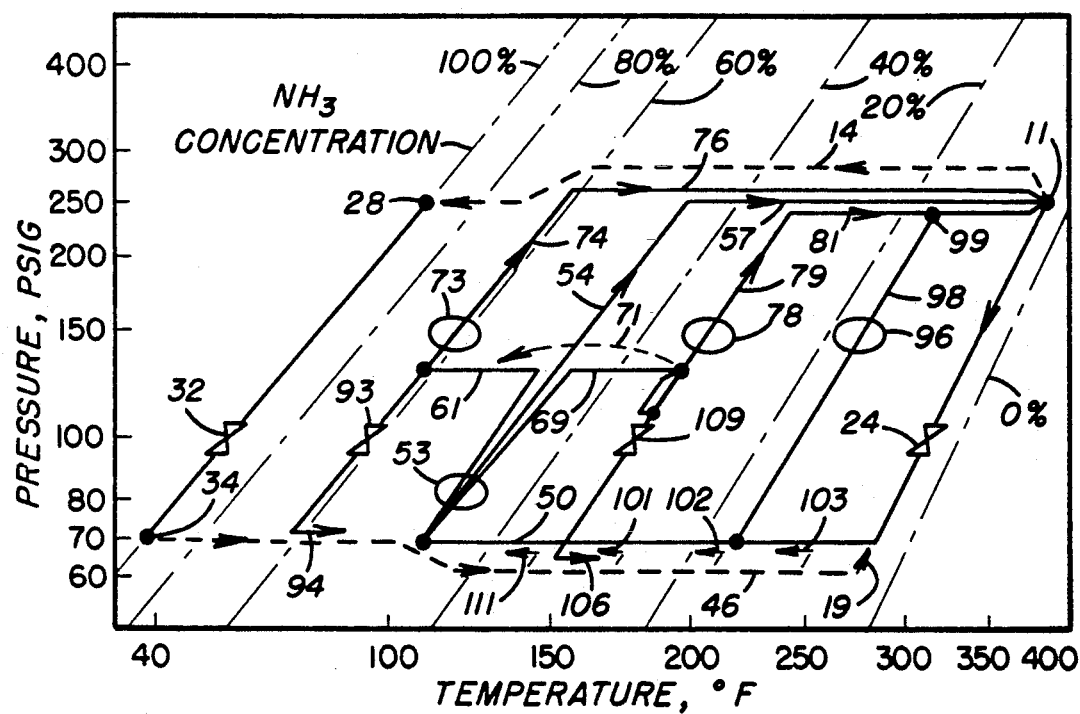
FIG. 1A is a pressure-temperature-concentration (PTX) thermodynamic diagram of the refrigeration cycle of FIG. 1, using ammonia/water as the working fluid pair, and showing the properties of the fluids at main locations in the cycle of FIG. 1.

The PTX diagram, FIG. 1A shows the pressure, temperatures and NH$_3$ concentrations of the fluids at various points in the above described cycle. In this PTX diagram liquids are represented by solid lines, while vapors are shown by dotted lines. All liquid and vapor lines upstream of expansion valve 32 and in direct communication with the interior of generator 11 will be at the 250 psig high-pressure side of the cycle, while all liquid and vapor lines upstream of pump 53 and in direct communication with the interior of the regenerator 16 will be at the 70 psig low-pressure side of the cycle.

The present invention improves on the basic regenerative absorption cycle described above in a number of interdependent ways.

First of all, multiple-stage absorption is provided to increase the heating of the working fluid prior to the time it reaches the externally-heated generator 11. As shown in FIG. 1, a single intermediate-pressure absorber 60 may be used for this purpose, absorber 60 having a tube 61 with liquid and vapor inlets 62 and 63 and an outlet 64, the tube 61 extending through the same shell 29 as absorber 50 and condenser 28 for cooling by the heat-sink fluid circulating through the shell.

Part of the liquid pumped by pump 53 from the low-pressure absorber 50 is pumped through line 66 to the inlet 62 of the intermediate-pressure absorber 60 and part is pumped through line 67 to the inlet 68 of the intermediate-pressure boiling conduit 69. Heat from the regenerator first sensibly heats the liquid solution, and then causes it to boil, with the vapors passing into conduit 71 for cooling and rectification. The condensed water drains back into the hottest part of the conduit 69 while the ammonia vapor leaves conduit 71 and goes to the vapor inlet 63 of the absorber 60.

As absorber tube 61 is cooled, the ammonia vapor will reabsorb into the solution so that the solution leaving outlet 64 will have a greater ammonia concentration than that leaving absorber 50. This richer solution is then pumped by pump 73 through line 74 to another 250 psig high-pumped pressure boiling conduit 76. As the solution passes through this conduit it too will be heated and will boil. The vapors mingle with those coming from generator 11 and pass to conduit 14 for cooling and rectification while the remaining solution drains into the generator 11 for further heating.

The solution remaining in the intermediate-pressure conduit 69 will flow into the conduit 77 and be cooled therein as it goes towards pump 78.

From there, the relatively low concentration solution is pumped up through line 79 to the inlet of yet another high-pressure boiling conduit 81. As with conduit 57 and 76, conduit 81 has its outlet in communication with conduits 14 and the interior of generator 11 so that vapor boiled off in conduit 81 will go to conduit 14 while the remaining solution goes to the generator 11.

Flow restrictors 82, 83 and 84 are provided in lines 54, 66 and 67 to set the distribution of flow from pump 53. Typically, the flows through restrictors 82, 83 and 84 will be 35%, 20% and 45% of the liquid from the low-pressure absorber 50.

A further aspect of the invention is that the rich solution from the absorber 60 is used to precool the high-pressure liquid ammonia in line 31 from the condenser 28 so as to minimize undesirable flashing of the liquid as its pressure is reduced by expansion valve 32. For this purpose, the high-pressure liquid ammonia passes through tube 86 of precooler 87, while the low-pressure ammonia vapor from evaporator 34 passes through the shell 88 of the precooler. Part of the solution from outlet 64 of the intermediate-pressure absorber 60, rich in ammonia, goes through line 91 and conduit 92 in the precooler to expansion valve 93 for pressure reduction. The expanded liquid exits at 94 into the interior of shell 88 and is heated by the liquid refrigerant in tube 86 to boil and absorb heat from the refrigerant in tube 86. The ammonia and water vapors from the boiling and the remaining solution will mix with the ammonia vapor from evaporator 34 and will pass through line 43 to the low-pressure conduit 46.

Another aspect of the invention is that a portion of the ammonia/water solution flowing through the regenerator 16 is recirculated back to the generator 11 to increase the amount of refrigerant vapor produced by the generator. For this purpose, pump 96 pumps liquid from a desired point 97 along the flow path through the regenerator and through line 98 to a suitable high pressure point in communication with the interior of generator 11, such as tube 99 projecting into high-pressure boiling conduit 81.

Further aspects of the invention are that the ammonia vapors coming from the evaporator 34 and the precooler 87 are injected into the liquid within the regenerator 16 at a number of points along the flow path of the liquid and that the ammonia concentration of the injected vapors are matched to the ammonia concentration of the solution into which the vapors are injected.

This is accomplished by providing conduit 46 with orifices 101, 102 and 103, which together with outlet 19 allows vapor 46 to be injected into each section of regenerator 16.

Ideally, the absorption of vapor into the liquid within regenerator 16 should be counterflow, with the liquid becoming gradually richer in refrigerant, while the vapor should become gradually richer in water vapor. Also, the flow rate of the liquid should gradually larger while the flow rate of the vapor become smaller. Such counterflow would best be achieved by using gravity to induce the liquid flow. However, since gravity is preferably used in the cycle to provide the counterflow rectification and mass transfer in the conduits 14, 57, 76, 81 and 69, then counterflow of the liquid and vapor in the regenerator must be best approximated by disposing the low-pressure conduit 46 in the bottom of the regenerator shell and letting the vapor bubble upwardly into the liquid as it travels through its up-and-down serpentine path. The orifices 101 102, 103 and 19 are sized so that the rate of injection into the liquid decreases towards the downstream end of conduit 46.

To provide for concentration matching, liquid of relatively low refrigerant concentration is injected through tube 106 into the upstream end of conduit 46, with the amount of injection being about 10% of the mass flow rate into conduit 46. The injected liquid boils in conduit 46 to produce a vapor that is rich in water, so that through orifice 101 is richer in refrigerant than the vapor at orifice 102, which in turn is richer in refrigerant than that of orifice 103. The vapors at orifices 103 and 19 are superheated and have the same concentration. If any excess liquid in conduit 46 remains, it is stopped at collecting ring 107 and drains through orifice 108 into the shell of the regenerator. For best COP, the amount of liquid injected into conduit 46 should be such that there is a minimal excess flow from orifice 108. With the abovedescribed injection, the COP can be increased by as much as 10%.

The fluid injected into conduit 46 can come from any source within the cold side of the regenerator. Preferably, it is picked up from the outlet of conduit 77 and expanded to low pressure by valve 109. However, if the liquid in line 43 from the precooler is sufficient, it may not be necessary to inject liquid through line 106.

In addition, vapor at the upstream end of conduit 46, wherein the ammonia concentration is highest, is injected through line 111 into the vapor inlet 112 of the absorber 29. Flow restrictor 113 maintains a slightly higher pressure in conduit 46 as compared to the pressure at the outlet 22 of the regenerator 16. The vapor injected into absorber 50 is absorbed by the solution coming from the regenerator to increase its concentration of refrigerant.

The primary heat produced in the regenerator for boiling the fluids in conduits 57, 76, 81, 69 and 46 comes from the absorption of the ammonia vapors into the liquid coming down from the generator 11. However, the rectifications in conduit 14 and 71 and the sensible cooling of the liquid is conduit 77 also contributes to the heating of the other conduits.

Figure 2A:
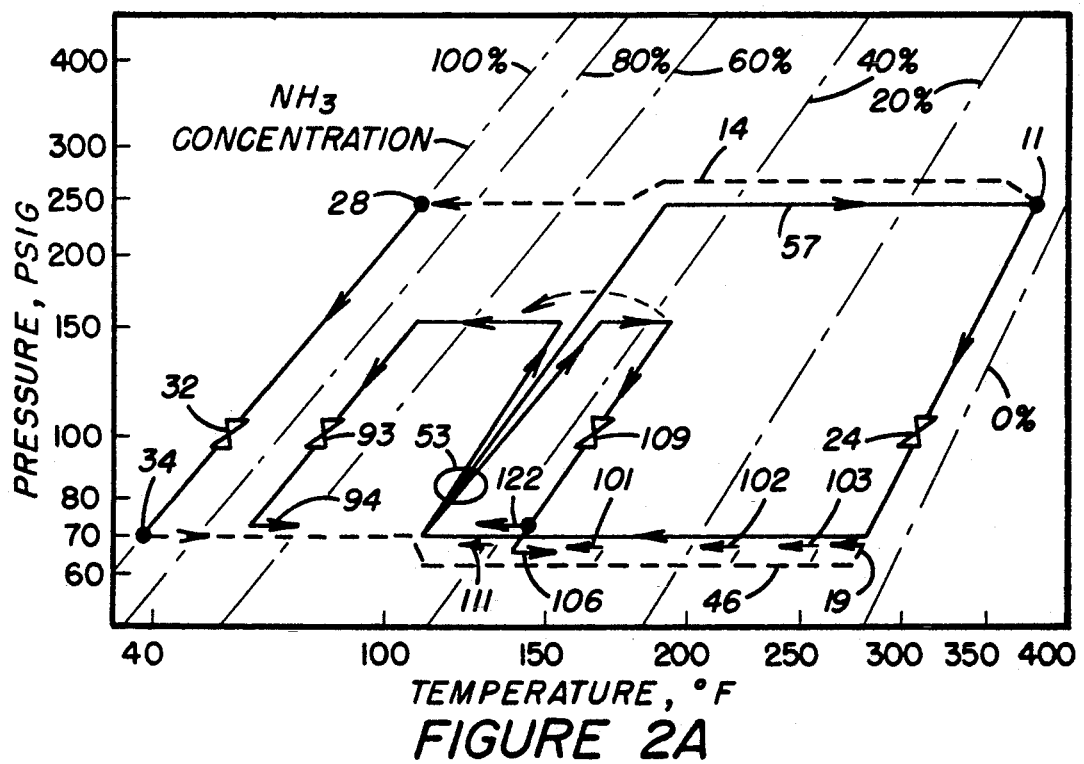
FIGS. 2 and 2A are a generally schematic, and corresponding PTX, diagrams of another embodiment of the invention, wherein the cycle uses only one pump.
Figure 2:
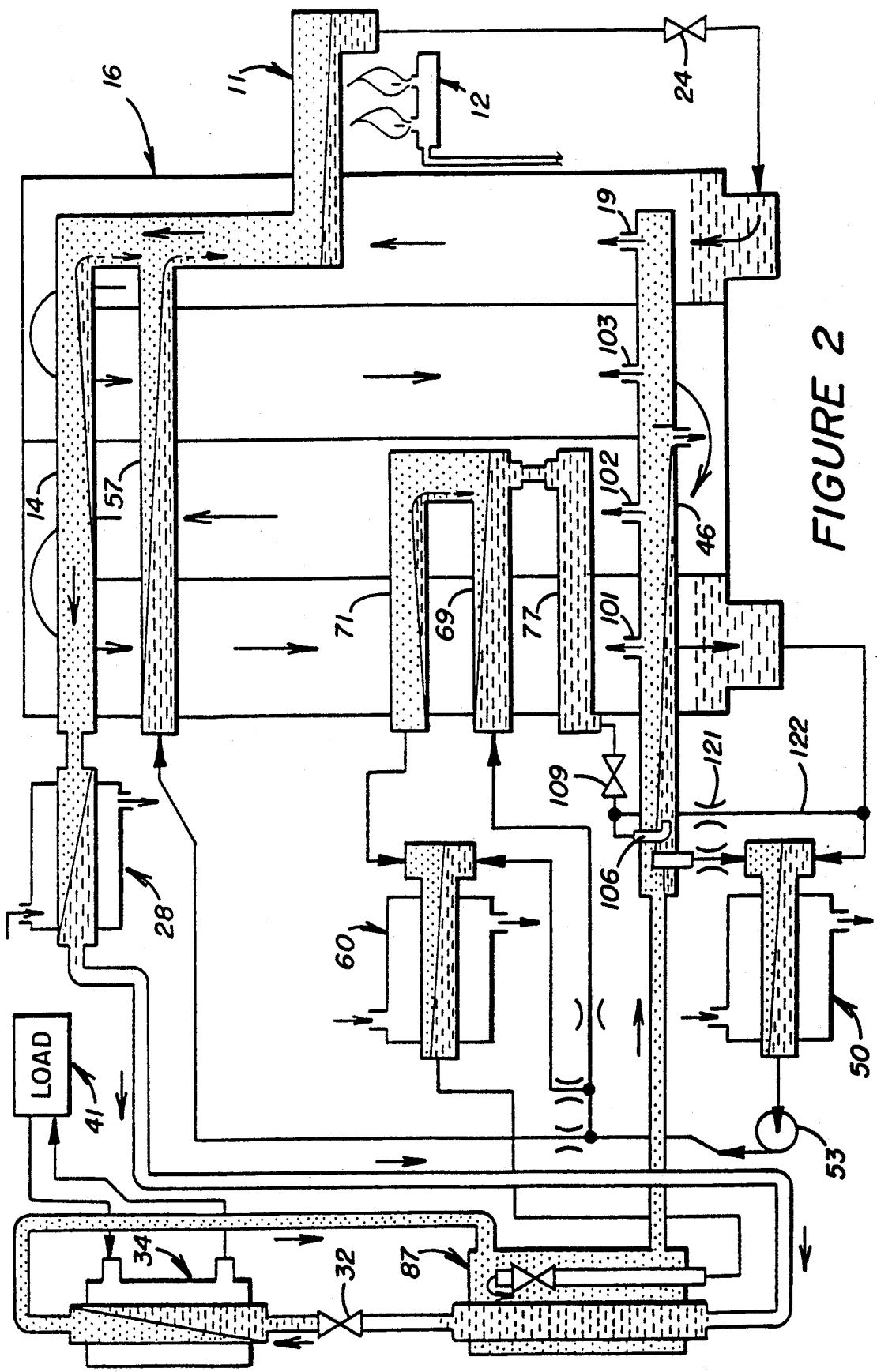

The fluids flowing though pumps 53 and 73 are cooled by absorber 50 and 60 to about 110° F., while the fluid flowing through pump 78 is at about the low-side temperature of the regenerator 16, i.e. about 150° F. As a consequence, high-temperature pumps are not needed in this cycle, thus reducing both the cost of the initial installation and the subsequent maintenance of the pumps FIGS. 2 and 2A are schematic and PTX diagrams of another preferred embodiment using only a single pump 53. The operation of the cycle is substantially the same as previously described in connection with FIGS. 1 and IA except that the following components of FIG. 1 are not used: pumps 73 and 78, lines 74 and 79, and boiling conduits 76 and 81. Also, it may be necessary to dump some of the liquid from conduit 77 through flow restrictor 121 and line 122 into line 47 to avoid excessive flow of liquid through tube 106 into conduit 46 and out through orifice 108.

Although recirculation pump 96 is not shown in FIG. 2, such a pump may be used in this cycle, if desired, to pump a portion of the fluid flowing through the regenerator 16 from a selected point along the flow path back to the interior of generator 11. The same is true in connection with the cycles of FIGS. 3 and 4.

Figure 3:
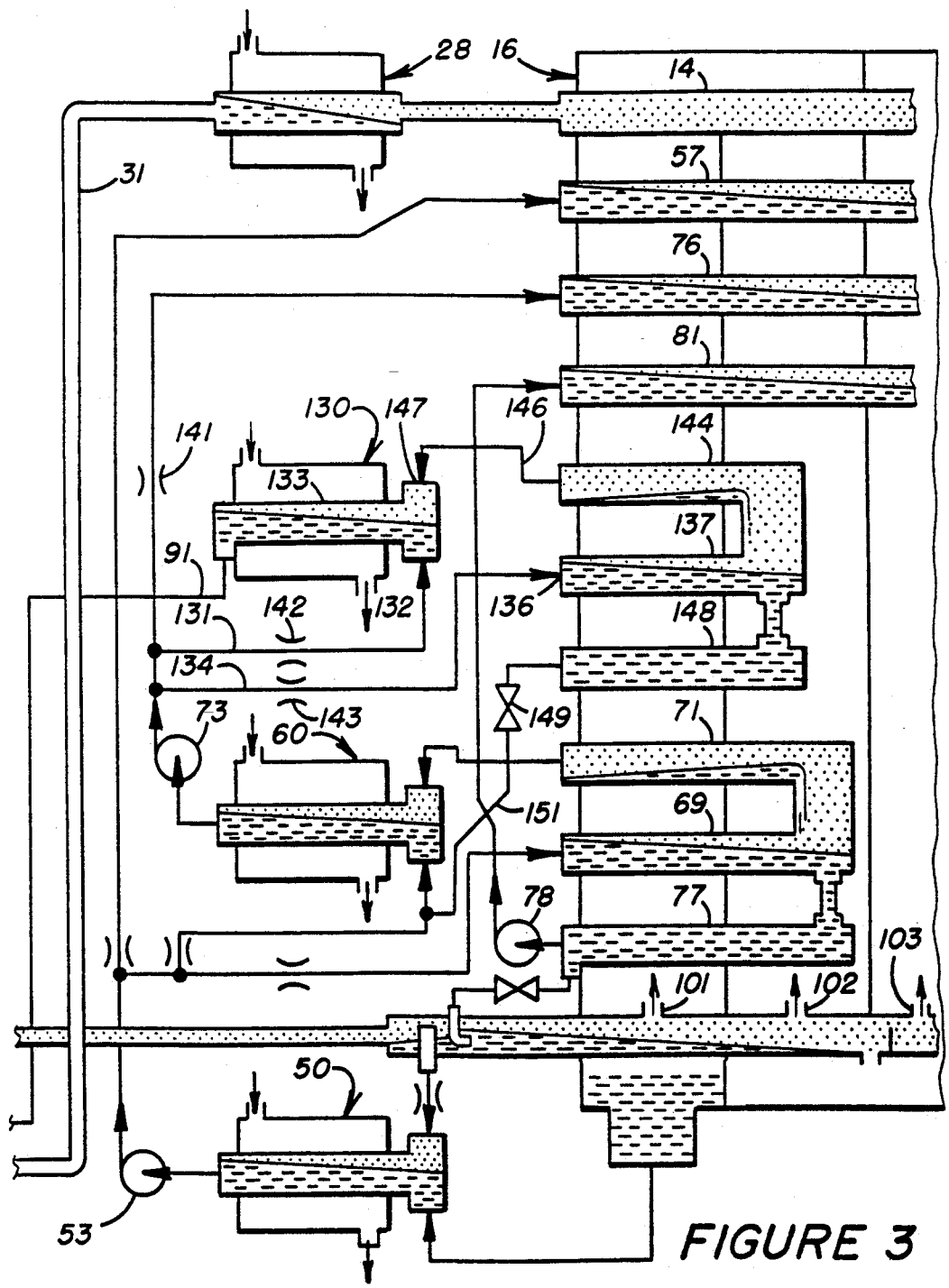
FIGS. 3 and 3A are a generally schematic, and corresponding PTX, diagrams of yet another embodiment of the invention, wherein the cycle has an additional absorber stage and uses only three pumps.
Figure 3A:
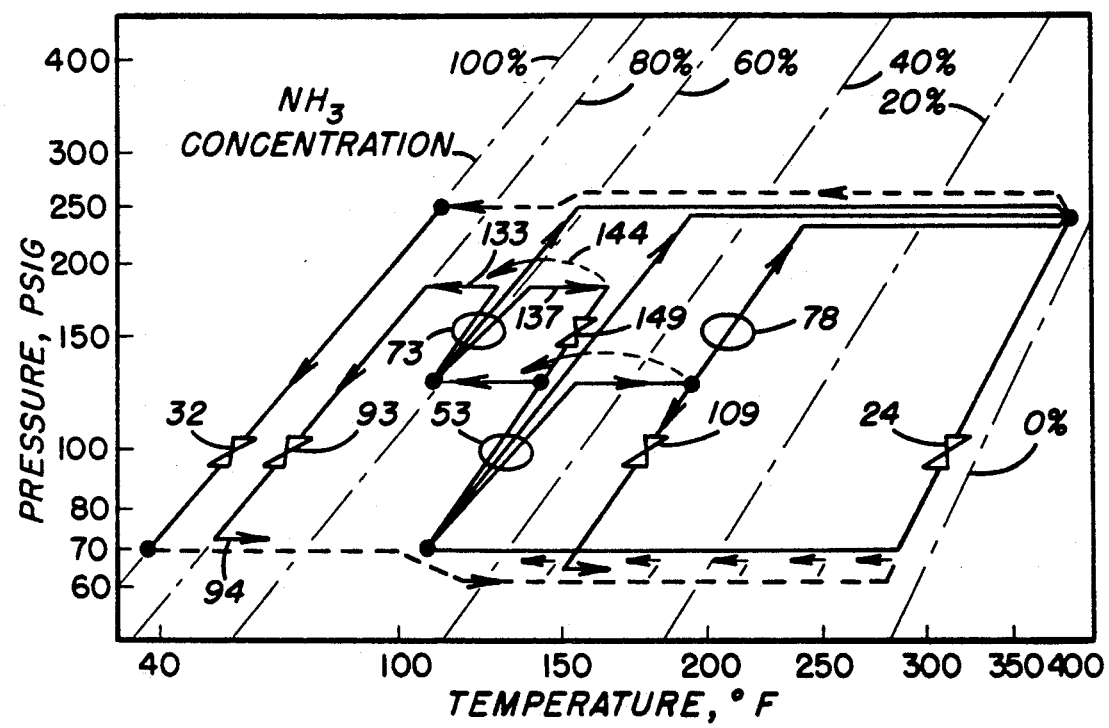

FIGS. 3 and 3A are schematic and PTX diagrams of another preferred embodiment also using three pumps as in the cycle of FIG. 1, but with the addition of a second intermediate-pressure absorber stage 130 to produce a solution having a higher $NH_3$ concentration.

This embodiment again operates substantially as described in connection with FIG. 1 except that the output of pump 73 is now split into three streams, with one stream going through line 74 to the high-pressure boiling conduit, another stream going through line 131 to the liquid inlet 132 of the tube 133 extending through the shell 29 of absorber 130, and the other stream going through line 134 to the inlet 136 of the second intermediate-pressure boiling conduit 137. Flow restrictors 141, 142 and 143 are sized to provide proper distribution of the flow from pump 73 to line 74, 131 and 134. The working pressure of the second intermediate-pressure conduit 137 and absorber 130 is higher than that of the intermediate-pressure conduit 69 and absorber 60 but less than that of the high-pressure portion of the cycle.

As before, the solution entering boiling conduit 137 will first be heated and then boil, with the vapors going through conduit 144 for cooling and rectification. The ammonia vapor will then go through line 146 to the vapor inlet 147 of the absorber tube 133. In the absorber 130, again cooled by the same heat-sink fluid as the other absorbers, the ammonia vapor will absorb into the liquid therein to produce a solution of higher $NH_3$ concentration than that produced by absorber 50 or 60. In this embodiment, line 91 from the conduit 92 in precooler 87 is connected to the outlet of absorber 130, rather than the to the outlet of absorber 60, so that a fluid richer in refrigerant will be sent to the precooler. This richer fluid will boil more readily in the shell of the precooler 87 and will cool the liquid ammonia in precooler conduit 86 to a greater degree. Such cooling further decreases the tendency of the liquid ammonia to flash as it goes through expansion valve 32.

The remaining liquid in boiling conduit 137 which flows into conduit 148 for cooling may be expanded to any convenient location. Preferably, it is expanded through valve 149 and conveyed by line 151 to the liquid inlet of the first intermediate-pressure absorber 60.

For best COP, the length that the boiling conduit 137 extends into regenerator 16 is such that the concentration of the liquid leaving conduit 148 matches that of the liquid going to absorber 60 from absorber 50. Generally, the length of conduit 137 is less than that of conduit 69 for this to occur.

Figure 4A:
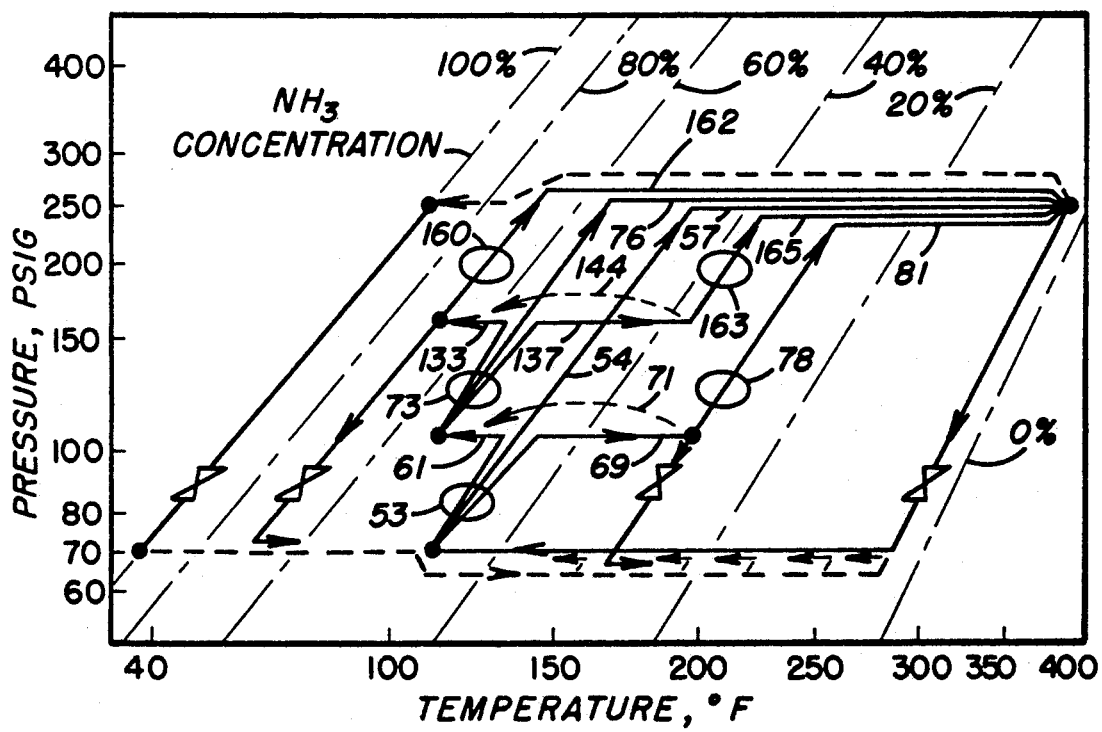
FIGS. 4 and 4A are generally similar to FIGS. 3 and 3A but show an embodiment of the invention wherein five smaller pumps are used in the cycle.
Figure 4:
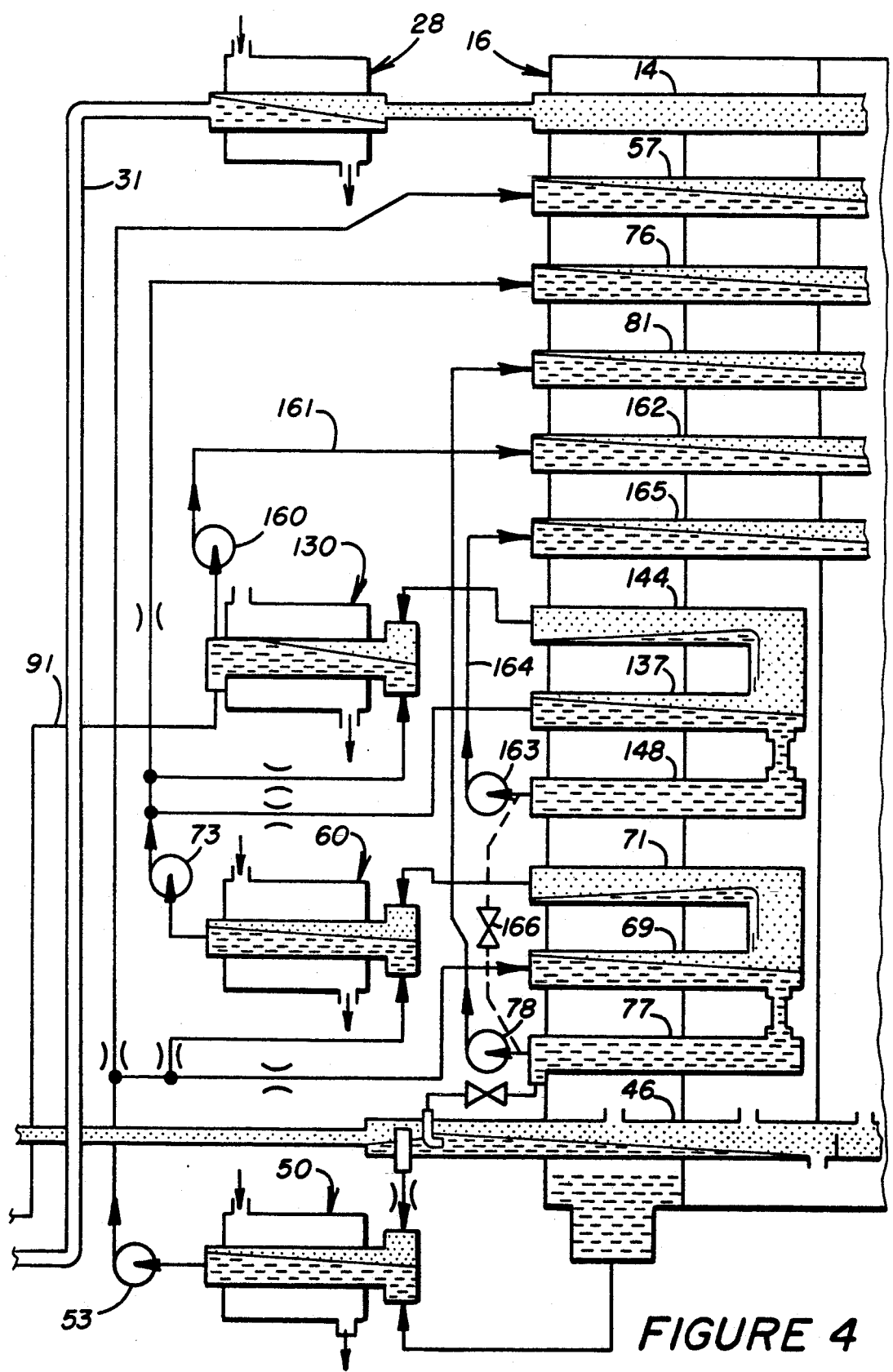

FIGS. 4 and 4A are schematic and PTX diagrams of yet another preferred embodiment. This cycle is essentially an extension of the cycle of FIG. 3 and uses five pumps. Pump 160 pumps part of the liquid output of absorber 130 through line 161 to the high-pressure boiling conduit 162. Instead of being expanded down to the inlet of absorber 60, the liquid output of the second intermediate-pressure conduit 148 is now pumped up by pump 163 through line 164 to another high-pressure boiling conduit 165. Conduits 162 and 165, like the other high-pressure boiling conduits 57, 76 and 81, have outlets in communication with the interior of generator 11.

In this embodiment the extension of the second intermediate-pressure boiling conduit 137 into the regenerator matches that of the first intermediate-pressure boiling conduit 69.

In order to reduce costs, pump 163 and high-pressure boiling conduit 165 may be eliminated, with the liquid output of conduit 148 being expanded down through expansion valve 166 (shown in dotted lines in FIG. 4) to merge with the liquid coming from conduit 77 so that both liquids can be pumped by pump 78. However, this mixing of two liquids of different concentrations may result in a loss of COP that may not justify the elimination of pump 163 and its associated elements. To minimize this loss of COP, the relative lengths of conduits 137 and 69 may be optimized for better concentration matching between the liquids. An example of such optimization would be to extend the length of conduit 137 deeper into the regenerator 16 until the concentration of the liquid in conduit 148 matches that in conduit 77. The length of conduit 69 should be extended to the location where the liquid starts boiling in the high-pressure boiling conduit 57, that is to the intersection of the line of constant concentration of the fluid pumped up through line 54 and the line of constant condenser pressure (i.e. 250 psig) as shown in the PTX diagram FIG. 4A.

One important aspect of the design of the regenerator 16, common to all embodiments, is the proper sizing of the heat transfer areas of the various conduits to achieve proper temperature matching of all boiling streams, especially the boiling stream in conduit 69. The temperature of liquid at a location where the conduit 69 ends should match the temperature where the liquid starts boiling in the high-pressure conduit 57. Such location, for typical space cooling applications, is about a little more than half the length of the regenerator 16 because the total amount of heat transferred between the conduits and the shell side of the regenerator up to the end of conduit 69 is about a little more than the total amount of heat transferred in the rest of the regenerator, assuming that the heat transfer areas between conduits and the shell side are uniformly distributed along the length of the regenerator and assuming that the heat transfer coefficients are constant.

The CO of the cycles shown in FIGS. 1 and 2 depends on the size of the regenerator. With the heat-sink fluid adequate for cooling the condenser 28 and absorbers 50 and 60 to a temperature of 110° F. and an evaporator temperature of 38° F., and a 100% heat exchange effectiveness in the regenerator, the COP are 1.51 and 1.25 for the cycles of FIGS. 1 and 2, respectively. By comparison, the COP for the prior art GAX cycle is 1.08. With optimum heat transfer regenerator area, the COP are 1.33, 1.17 and 1.03 for the cycles of FIGS. 1 and 2 and the GAX cycle.

Various modifications of the cycles described above may be made.

For example, the cycles have been specifically described in connection with refrigeration systems, i.e. where the work performed by the high pressure vapor is the cooling of load 41. However, the high pressure vapor could also be used to drive a turbine, by the substitution of a turbine for the condenser 28, expansion valve 32 and evaporator 34. In either case, the condenser-valve-evaporator system or a turbine would constitute means connected between and reducing the pressure from the vapor outlet of the generator 11 and a vapor inlet 101, 102, 103 or 19 of the regenerator 16.

Also, in FIGS. 1-4, the liquid pumped up to the liquid inlet of the intermediate boiling tube 69 has been shown as pumped up from the outlet 52 of the low-pressure absorber stage 50 by pump 53.

This is the preferred point in the low-pressure side of the cycle, i.e. upstream of pump 53 because the liquid at that point has the highest concentration of ammonia in the low-pressure side of the cycle. However, the liquid going to the intermediate-pressure boiling conduit 69 could be taken from another point in the low-pressure side, such as from line 47 to the absorber 50 or from a point within the shell of the regenerator 16, as long as the liquid at the selected point has a concentration high enough to produce the desired amount of ammonia, when boiled in conduit 69, for absorption into the liquid flowing through the intermediate-pressure absorber stage 60. If a point is selected other than at the outlet of the low-pressure absorber stage 50, then another pump would be required to pump the low-pressure liquid up to the pressure of the intermediate-pressure boiling conduit 69.

The foregoing description of the preferred embodiments have been presented for the purposes of illustration and description. It is not intended to be exhaustive or to limit the invention to the precise features described, and obviously many other modifications and variations are possible in light of the above teaching. The embodiments were shown in order to explain most clearly the principles of the invention and the practical applications thereby to enable others in the art to utilize most effectively the invention in various other modifications as may be suited to the particular use contemplated. It is intended that the scope of the invention be defined by the claimed appended thereto.

What is claimed is:

1. A multiple stage-absorber regeneration absorption cycle comprising:
    a high-pressure externally-heated generator having an interior and liquid and vapor outlets,
    a regenerator having a shell, liquid and vapor inlets into the interior of said shell, and an outlet from the interior of said shell spaced away from said liquid inlet,
    means connected between and reducing the pressure from the vapor outlet of said generator to a vapor inlet of said regenerator,
    means connecting and reducing the pressure from the liquid outlet of said generator to the liquid inlet of said regenerator,
    a first, and low-pressure, absorber stage having a liquid inlet connected to the outlet of said regenerator and an outlet,
    a high-pressure boiling conduit within said regenerator and having an outlet in communication with the interior of said generator and an inlet,
    an intermediate-pressure boiling conduit within said regenerator and having a liquid inlet and a vapor outlet,
    a second, and intermediate-pressure, absorber stage having a vapor inlet connected to the vapor outlet of said intermediate-pressure conduit, a liquid inlet and an outlet,
    means for pumping liquid (i) at a high pressure from the outlet of said first absorber stage to the inlet of said high-pressure boiling conduit, (ii) at an intermediate pressure from the outlet of said first absorber stage to the liquid inlet of said second absorber stage, and (iii) at said intermediate pressure from a predetermined low-pressure point in said cycle to the liquid inlet of said intermediate-pressure boiling conduit, means connecting the outlet of said second absorber stage to a predetermined point in said cycle.

2. A multiple-stage-absorber regenerative absorption cycle as set forth in claim 1, and further including:
a second high-pressure boiling conduit within said regenerator and having an outlet in communication with the interior of said generator and an inlet,
wherein said means for connecting the outlet of said second absorber stage to a predetermined point in said cycle includes means for pumping fluid from the outlet of said second absorber stage at a high pressure to the inlet of said second high-pressure boiling conduit.

3. A multiple-stage-absorber regenerative absorption cycle as set forth in claim 2, wherein said first intermediate-pressure boiling conduit within said regenerator has a liquid outlet, and further including:
a third high-pressure boiling conduit within said regenerator and having an outlet in communication with the interior of said generator and an inlet,
means for pumping fluid from the liquid outlet of said first intermediate-pressure boiling conduit at a high pressure to the inlet of said third high-pressure boiling conduit.

4. A multiple-stage-absorber regenerative absorption cycle as set forth in claim 1,
wherein said means connected between and reducing the pressure from the vapor outlet of said generator to a vapor inlet of said regenerator includes (i) a condenser having an inlet connected to the vapor outlet of said generator, (ii) a low-pressure evaporator having an inlet and an outlet, (iii) a pressure reducing expansion valve, (iv) means connecting the outlet of said condenser through said expansion valve to the inlet of said evaporator, and (v) means connecting the outlet of said evaporator to a vapor inlet of said regenerator,
and further including:
a pre-cooler having a shell and a conduit extending through said shell, said conduit being connected between the outlet of said condenser and said expansion valve, said shell having a vapor inlet connected to the outlet of said evaporator, a liquid inlet, and an outlet connected to the vapor inlet of said regenerator,
and wherein said means for connecting the outlet of said second absorber stage to a predetermined point in said cycle includes means for connecting and reducing the pressure from the outlet of said second absorber stage to the liquid inlet of said pre-cooler shell.

5. A multiple-stage-absorber regenerative absorption cycle as set forth in claim 1,
wherein said means connected between and reducing the pressure from the vapor outlet of said generator to a vapor inlet of said regenerator includes (i) a condenser having an inlet connected to the vapor outlet of said generator, (ii) a low-pressure evaporator having an inlet and an outlet, (iii) a pressure reducing expansion valve, (iv) means connecting the outlet of said condenser through said expansion valve to the inlet of said evaporator, and (v) means connecting the outlet of said evaporator to a vapor inlet of said regenerator,
and further including:
a pre-cooler having a shell and a conduit extending through said shell, said conduit being connected between the outlet of said condenser and said expansion valve, said shell having a vapor inlet connected to the outlet of said evaporator, a liquid inlet, and an outlet connected to the vapor inlet of said regenerator,
and where in said means for connecting the outlet of said second absorber stage to a predetermined point in said cycle includes:
(i) a second high-pressure boiling conduit with regenerator having an outlet in communication with the interior of said generator and an inlet,
(ii) means for pumping fluid from the outlet of said second absorber stage at a high pressure to the inlet of said second high-pressure boiling conduit, and
(iii) means for connecting and reducing the pressure from the outlet of said second absorber stage to the inlet of said pre-cooler shell.

6. A multiple-stage absorber regenerative absorption cycle as set forth in claim 1, and further including:
a second high-pressure conduit within said regenerator and having an outlet in communication with the interior of said generator and inlet,
a second intermediate-pressure boiling conduit within said regenerator having a liquid inlet and a vapor outlet,
a third, and intermediate-pressure, absorber stage having a vapor inlet connected to the vapor outlet of said second intermediate-pressure boiler conduit, a liquid inlet and an outlet,
wherein said means for connecting the outlet of said second absorber stage to a predetermined point in said cycle includes means for pumping fluid from the outlet of said second absorber stage (i) at a high pressure to the inlet of said second high-pressure conduit, (ii) at a second intermediate-pressure conduit to the inlet of said second intermediate-pressure conduit, and (iii) at said second intermediate pressure to the liquid inlet of said third absorber stage,
means connecting of said third absorber stage to a predetermined point in said cycle.

7. A multiple-stage-absorber regenerative absorption cycle as set forth in claim 6, and further including:
a third high-pressure boiling conduit within said regenerator and having an outlet in communication with the interior of said generator and an inlet,
and wherein said means for connecting the outlet of said third absorber stage to a predetermined point in said cycle includes means for pumping fluid from the outlet of said third absorber stage at a high pressure to the inlet of said third high-pressure boiling conduit.

8. A multiple-stage-absorber regenerative absorption cycle as set forth in claim 7, wherein said first intermediate-pressure boiling conduit within said regenerator has a liquid outlet, and further including,
a fourth high-pressure boiling conduit within said regenerator and having an outlet in communication with the interior of said generator and an inlet,
means for pumping fluid from the liquid outlet of said first intermediate-pressure boiling conduit at a high pressure to the inlet of said fourth high-pressure boiling conduit.

9. A multiple-stage-absorber regenerative absorption cycle as set forth in claim 8, wherein said second intermediate-pressure boiling conduit within said regenerator has a liquid outlet, and further including,
a fifth high-pressure boiling conduit within said regenerator and having an outlet in communication with the interior of said generator and an inlet,
means for pumping fluid from the liquid outlet of said second intermediate-pressure boiling conduit at a high pressure to the inlet of said fifth high-pressure boiling conduit.

10. A multiple-stage-absorber regenerative absorption cycle as set forth in claim 6,
wherein said means connected between and reducing the pressure from the vapor outlet of said generator to a vapor inlet of said regenerator includes (i) a condenser having an inlet connected to the vapor outlet of said generator, (ii) a low-pressure evaporator having an inlet and an outlet, (iii) a pressure reducing expansion valve, (iv) means connecting the outlet of said condenser through said expansion valve to the inlet of said evaporator, and (v) means connecting the outlet of said evaporator to a vapor inlet of said regenerator,
and further including:
a pre-cooler having a shell and a conduit extending through said shell, said conduit being connected between the outlet of said condenser and said expansion valve, said shell having a vapor inlet connected to the outlet of said evaporator, a liquid inlet, and an outlet connected to the vapor inlet of said regenerator,
and wherein said means for connecting the outlet of said third absorber stage to a predetermined point in said cycle comprises means for connecting and reducing the pressure from the outlet said third absorber stage to the liquid inlet of said pre-cooler shell.

11. A multiple-stage-absorber regenerative absorption cycle as set forth in claim 6,
wherein said means connected between and reducing the pressure from the vapor outlet of said generator to a vapor inlet of said regenerator includes (i) a condenser having an inlet connected to the vapor outlet of said generator, (ii) a low-pressure evaporator having an inlet and an outlet, (iii) a pressure reducing expansion valve, (iv) means connecting the outlet of said condenser through said expansion valve to the inlet of said evaporator, and (v) means connecting the outlet of said evaporator to a vapor inlet of said regenerator,
and further including:
a pre-cooler having a shell and a conduit extending through said shell, said conduit being connected between the outlet of said condenser and said expansion valve, said shell having a vapor inlet connected to the outlet of said evaporator, a liquid inlet, and an outlet connected to the vapor inlet of said regenerator,
and wherein said means for connecting the outlet of said third absorber stage to a predetermined point in said cycle includes (i) a third high-pressure boiling conduit within said regenerator having an outlet in communication with the interior of said generator and an inlet,
(ii) means for pumping fluid from third absorber stage at a high pressure to the inlet of said third high-pressure boiling conduit, and
(iii) means for connecting and reducing the pressure from the outlet of said third absorber stage to the liquid inlet of said pre-cooler shell.

12. A multiple-stage-absorber regenerative absorption cycle as set forth in claim 11, wherein said first and second intermediate-pressure boiling conduits within said regenerator each has a liquid outlet, and further including,
fourth and fifth high-pressure boiling conduits within said regenerator and each having an outlet in communication with the interior of said qenerator and an inlet,
means for pumping fluid from the liquid outlet of said first intermediate-pressure boiling conduit at a high pressure to the inlet of said fourth high-pressure boiling conduit,
means for pumping fluid from the liquid outlet of said second intermediate-pressure boiling conduit at a high pressure to the inlet of said fifth high-pressure boiling conduit.

13. A multiple-stage-absorber regenerative absorption cycle as set forth in claim 1, wherein fluid flow in said regenerator shell is in an elongated flow path with upstream and downstream ends relative to the flow from said liquid inlet thereof to said outlet thereof,
wherein said means connecting the vapor outlet of said generator to a vapor inlet of said regenerator shell includes an elongated low-pressure conduit having upstream and downstream ends relative to flow of fluid therethrough from said generator, and further includes means for injecting vapor from a plurality of progressively downstream points along said low-pressure conduit into progressively upstream locations along said elongated flow path within said regenerator shell.

14. A multiple-stage-absorber regenerative absorption cycle as set forth in claim 13, wherein said first absorber stage has a vapor inlet, and further including:
means for injecting vapor from the upstream end of said low-pressure conduit into the vapor inlet of said first absorber stage.

15. A multiple-stage-absorber regeneration absorption cycle as set forth in claim 13, wherein said low-pressure conduit is disposed within said shell of said regenerator, wherein said intermediate-pressure boiling conduit within said regenerator has a liquid outlet, and further including means for connecting the liquid outlet of said intermediate-pressure boiling conduit to the upstream end of said low-pressure conduit.

16. A multiple-stage-absorber regenerative absorption cycle as set forth in claim 15, wherein said first absorber stage has a vapor inlet, and further including:
means for injecting vapor from the upstream end of said low-pressure conduit into the vapor inlet of said first absorber stage.

17. A multiple-stage-absorber regenerative absorption cycle as set forth in claim 4, wherein fluid flow in said regenerator shell is in an elongated flow path with upstream and downstream ends relative to the flow from said liquid inlet thereof to said outlet thereof,
wherein said means connecting the vapor outlet of said generator to a vapor inlet of said regenerator shell includes an elongated low-pressure conduit having upstream and downstream ends relative to flow of fluid therethrough from said generator, and further includes means for injecting vapor from a plurality of progressively downstream points along said low-pressure conduit into progressively upstream locations along said elongated flow path within said regenerator shell.

18. A multiple-stage-absorber regenerative absorption cycle as set forth in claim 17, wherein said low-pressure conduit is disposed within said shell of said regenerator, wherein said intermediate-pressure boiling conduit within said regenerator has a liquid outlet, and further including means for connecting the liquid outlet of said intermediate-pressure boiling conduit to the upstream end of said low-pressure conduit.

19. A multiple-stage-absorber regenerative absorption cycle as set forth in claim 1, wherein said means connecting the vapor outlet of said generator to a vapor inlet of said regenerator shell includes an elongated low-pressure conduit disposed within said shell of said regenerator and having an upstream end and at least one outlet opening into said shell of said regenerator, and further including:
means for injecting low-pressure liquid from a predetermined point in said cycle into the upstream end of said low-pressure conduit.

20. A multiple-stage-absorber regenerative absorption cycle as set forth in claim 1, wherein fluid flow in said regenerator shell is in an elongated flow path with upstream and downstream ends relative to the flow from said liquid inlet thereof to said outlet thereof, and further including:
means for pumping a portion of the fluid flowing through said regenerator shell from a selected point along the length of said flow path back to the interior of said generator.

* * * * *